Nov. 15, 1966 P. D. COREY 3,286,155
STATIC INVERTER
Filed March 15, 1963 2 Sheets-Sheet 1
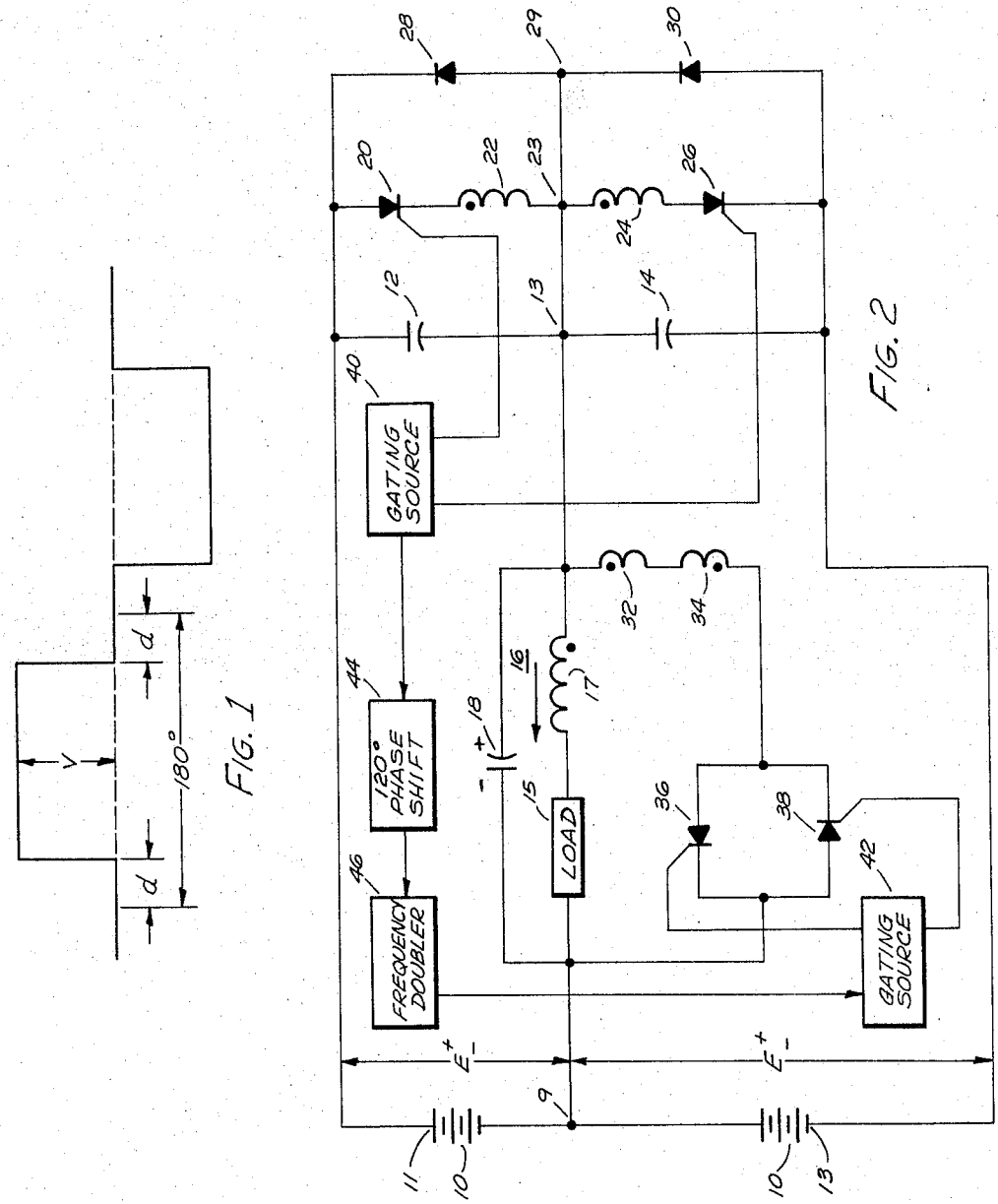
INVENTOR.
PHILIP D. COREY
BY Isidore Match
HIS ATTORNEY

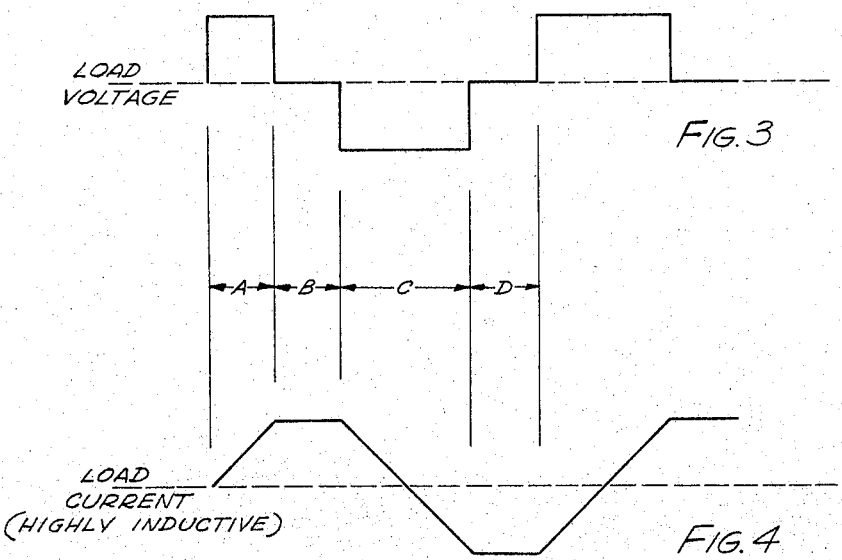

United States Patent Office 3,286,155
Patented Nov. 15, 1966

3,286,155
STATIC INVERTER
Philip D. Corey, Waynesboro, Va., assignor to General Electric Company, a corporation of New York
Filed Mar. 15, 1963, Ser. No. 265,392
4 Claims. (Cl. 321—45)

This invention relates to static inverters. More particularly, it relates to an improved static inverter from which there is produced a quasi-square wave output voltage free of objectionable harmonics.

In systems for converting A.C. power of one frequency to A.C. power of another frequency, for converting unidirectional power to alternating current power, etc., the common practice has been to utilize static inverters which convert unidirectional power to a square wave alternating current form. Generally, there is desired as the output of such conversion system, a voltage having a relatively pure sinusoidal waveform. Because of the harmonics in the square wave output, especially the 33⅓% third harmonic, to convert the inverter output square wave to a sinusoidal wave entails the use of a large output filter. Since such large filter is quite heavy, as it may comprise as much as 20% by weight of the total conversion system, the need therefor is very disadvantageous, especially in those situations where weight is at a premium such as in airborne vehicles. Of course, in any situation, a large filter is very expensive.

Accordingly, it is a primary object of this invention to provide a static inverter whose output is a quasi-square wave, the dwell angle in the output wave being chosen such that chosen harmonics of the fundamental are eliminated therefrom.

It is a further object to provide a static inverter in accordance with the preceding object whose output does not depend upon electrical load power factor and magnitude considerations but only on the instantaneous positions of the complementary switching devices contained therein whereby the circuit load may have one end connected to the midpoint of an input voltage source, thereby eliminating the need for an output transformer while maintaining the same input and output ground reference points.

Generally speaking and in accordance with the invention, there is provided a circuit for converting the output of a unidirectional potential source to a quasi-square wave of a given frequency and having a form in accordance with the expression:

$$A_n = \frac{4V}{\pi}\sum_n (\cos n\alpha) \frac{\sin n\omega t}{n}$$

wherein $n$ is an odd number of a chosen value, V is the voltage amplitude and $\alpha$ is equal to one half of the angle between each positive and negative going portion of the wave, the angle $\alpha$ being chosen such that $\cos n\alpha$ is equal to zero. The circuit comprises a series arrangement of first and second switching devices having first and second series arranged inductances therebetween, a first capacitance connected across the series combination of the first switching device and the first inductance and a second capacitance connected across the series combination of the second inductance and the second switching device, the junctions of the capacitances and the inductances being joined. A load is disposed intermediate these junctions and the midpoint of the source, a third capacitance being connected across the load. There are further provided a parallel combination of oppositely poled third and fourth switching devices, a series combination of third and fourth inductances in transformer relationship of like polarity with the first and second inductances respectively connected between one end of the parallel combination and one end of the load, the other end of the parallel combination being connected to the other end of the load. Also, included are first means in circuit with the first and second devices for alternately switching the first and second devices at consecutive half cycles and second means in circuit with the third and fourth devices for concurrently switching the third and fourth devices at each half cycle in a phase retarded (180°—2α) with respect to the phase of the first means.

The novel features which are believed to be characteristic of this invention are set forth with particularity in the appended claims. The invention itself, however, both as to its organization and method of operation together with further objects and advantages thereof may best be understood by reference to the following description taken in connection with the accompanying drawings.

In the drawings, FIG. 1 is a depiction of the classic symmetrical quasi-square wave;

FIG. 2 is an illustrative embodiment of the invention; and

FIGS. 3 and 4 together comprise a timing diagram of the voltage and current waveforms appearing across the load in the embodiment shown in FIG. 2.

In FIG. 1 wherein there is depicted a symmetrical quasi-square wave, the angle $\alpha$ is the dwell angle which exists between the initial point of a half cycle and the leading edge of a voltage pulse and which exists between the trailing edge of the voltage pulse and the end of the half cycle. Thus the zero portions of the wave, i.e., the dwell angles are equal to $2\alpha$. The formula which expresses the voltage of each harmonic comprising this waveform is:

$$A_n = \frac{4V}{\pi}\sum_n (\cos n\alpha) \frac{\sin n\omega t}{n}$$

wherein $n$ is an odd number and V is the amplitude of the wave. Thus to eliminate a given harmonic, it is necessary to select a dwell angle which multiplied by the order of such given harmonic is equal to 90° or an odd number multiple thereof. Consequently, to eliminate the third harmonic, angle $\alpha$ is chosen to be equal to 30°, etc.

In the embodiment of FIG. 2, there is shown a circuit constructed in accordance with the principles of the invention which effects the conversion of input unidirectional power to an output quasi-square wave having a dwell angle whose magnitude is chosen to eliminate the presence of a particular odd number harmonic. The waveform of FIG. 3 is illustrative of the voltage appearing across the load of the circuit of FIG. 2 when the dwell angle $\alpha$ is chosen to be 30° whereby there is eliminated the 33⅓% third harmonic and which is generally the most objectionable, since, due to its high percentage in a square wave, it requires a large filter to effect its removal. In this waveform, all other odd number triplet harmonics are also eliminated.

Referring now to FIG. 2, a center-tapped unidirectional potential source 10 has connected thereacross the series arrangement of capacitors 12 and 14, the midpoint 9 of source 10 and the junction 13 of capacitors 12 and 14 having connected therebetween a load 16, the load being shown as comprising the series arrangement of a resistance 15 and an inductance 17. A capacitor 18 is provided in shunt with load 16. Also connected across source 10 is the series arrangement of the anode to cathode path of a silicon controlled rectifier 20, an inductor 22, an inductor 24, and the anode to cathode path of a silicon controlled rectifier 26, and the series arrangement of the cathode to anode paths of diodes 28 and 30. Junction 13, the junction 23 of inductors 22 and 24 and the junction 29 of diodes 28 and 30 are connected to each other. Also connected in shunt with load 16 is the series combination of an inductor 32 and an inductor 34 in transformer relationship with inductors 22 and 24 respectively in the polarities shown and the parallel arrangement of oppositely poled silicon controlled rectifiers 36 and 38. The dot designated terminals on pairs of inductors 22 and 32, and 24 and 34 respectively indicate like concurrent voltage polarities at these terminals.

A gating source 40 having the desired output frequency of the system is provided for gating silicon controlled rectifiers 20 and 26 at alternate half cycles. A gating source 42 is provided for simultaneously gating silicon controlled rectifiers 36 and 38. Gating source 42 and silicon controlled rectifiers 36 and 38 are so arranged that silicon controlled rectifiers 36 and 38 are concurrently gated during each half cycle of output from gating source 42 and at a point 120° retarded in phase with respect to each half cycle of output of gating source 40 when it is desired to have a dwell angle equal to 30°.

Considering the operation of the circuit of FIG. 2, if it is assumed that silicon controlled rectifier 20 is in the conductive state, then current flows through its anode to cathode path and through the load 16 to midpoint 9. Consequently, a voltage is established across the load with the dot end of inductance 17 being positive. At this time the voltage and current conditions as shown in region A of FIGS. 3 and 4 prevail across load 16 (load 16 is assumed to be highly inductive).

Now, at the 120° point in the conductive half cycle of silicon controlled rectifier 20, silicon controlled rectifiers 36 and 38 have applied thereto the output of gating source 42, gating concurrently being removed from silicon controlled rectifier 20. This application renders silicon controlled rectifiers 36 and 38 conductive and capacitor 18 which had charged to a value of voltage E (half of the value of source 10) during the conductive half cycle of silicon controlled rectifier 20 now discharges through inductors 32 and 34, and silicon controlled rectifier 36 to midpoint 9. As a consequence of such discharge and the transformer action between inductors 32 and 22 in the polarities as shown by the respective designating dot terminals thereon, silicon controlled rectifier 20 is placed in its blocking state. When capacitor 18 so discharges, the voltage and current conditions across load 16 are those shown in region B of FIGS. 3 and 4.

Now, when the next half cycle of output from gating source 40 is applied to silicon controlled rectifier 26, capacitor 14 which during the conductive half cycle of silicon controlled rectifier 20 had charged to the voltage appearing at the positive terminal 11 of source 10 now discharges through inductor 24 and silicon controlled rectifier 26. Consequently, the transformer action between inductors 24 and 34 in the polarities as shown by the designating polarity dots thereon places silicon controlled rectifier 38 in the blocking state. Current now flows from midpoint 9 through load 16, inductor 24 and silicon controlled rectifier 26 to the negative terminal 13 of source 10, the voltage at the dot terminal of inductance 17 being negative and capacitor 18 charging to a voltage E in the opposite polarity. The voltage and current conditions which obtain at this time are those shown in region C of FIGS. 3 and 4. During the time that silicon controlled rectifier 26 is conductive, capacitor 12 charges to the potential from terminals 9 to 13. Silicon controlled rectifier 36 is, of course, rendered nonconductive at the time that the polarity of the voltage across load 16 switches.

Now, at the 120° point of the conductive half cycle of silicon controlled rectifier 26, silicon controlled rectifiers 36 and 38 are again gated into conductivity to cause a series of events analogous to those which had occurred at the 120° point of the conductive half cycle of silicon controlled rectifier 20. Thus, capacitor 18 discharges through silicon controlled rectifier 38 and inductors 34 and 32, the transformer action between inductors 34 and 32 placing silicon controlled rectifier 26 in its blocking state. The voltage and current conditions which obtain at this time are those shown in region D of FIGS. 3 and 4. With the initiation now of the next cycle of output from the circuit, i.e., with the gating of silicon controlled rectifier 20, the foregoing events are repeated.

It is accordingly seen, that with the arrangement of FIG. 2, there is provided an output voltage in the form of a quasi-square wave having a dwell angle of 30°. Such waveform, of course, does not contain any odd number triplet harmonics.

It is appreciated that to produce the 30° dwell angle, for example, in the waveform of FIG. 3, silicon controlled rectifiers 36 and 38 have to be gated concurrently at twice the frequency that either silicon controlled rectifier 20 or 26 is gated and that such concurrent gating has to occur at the 120° point in each half cycle of output from gating source 40. Gating sources 40 and 42 may be independent stages. Alternatively, to produce the gating signals for silicon controlled rectifiers 36 and 38, gating source 40 may be a magnetic coupled multivibrator having the desired output frequency and may have its output applied to 120° phase shifter 44 to produce an output voltage, the same as that of the output of gating source 40 but retarded in phase 120° with respect thereto. Such phase shifted output may then be applied as a driving signal to a frequency doubler 46 whose output has twice the frequency of the output of gating source 40. Phase shifter 44 may suitably be a saturable reactor having a core whose volt-second characteristic is so chosen that it imparts 120° delay to the input applied thereto.

From the foregoing, it is seen that with the circuit of FIG. 2, there is enabled the conversion of an input unidirectional potential to a quasi-square wave output whose dwell angle may be chosen to eliminate a given harmonic.

It is to be noted that silicon controlled rectifiers 20, 26, 36 and 38 are enabled to function as single pole double throw switches with an UP, DOWN, or center OFF position whereby their conductive state is not influenced by load magnitude and power factor, i.e., effectively, the turning on of one of the silicon controlled rectifiers causes the turning off of the other of the appropriate other silicon controlled rectifier. This permits the elimination of an output transformer since one end of the load such as load 16 can be connected to the midpoint of source 10 to positively regulate the load with respect to a system reference point. Diodes 28 and 30 permit the return of energy to the unidirectional potential source in conditions such as those of reactive loads. Such diodes are often referred to as "pumpback diodes."

It is to be realized that although the embodiment of FIG. 2 shows the use of silicon controlled rectifiers as the switching devices therein, transistors, relays or other type switching devices may be utilized.

While there has been shown a particular embodiment of this invention, it will, of course, be understood that it is not intended to be limited thereto since many modifications both in the circuit arrangements and in the instrumentalities employed therein may be made and it is therefore contemplated by the appended claims to cover any such modification as falls within the true spirit and scope of the invention.

What is claimed as new and desired to be secured by Letters Patent of the United States is:

1. A circuit for converting the output of a unidirectional potential source to a quasi-square wave of a given frequency and having a form in accordance with the expression $$A_n = \frac{4V}{\pi} \sum_n \cos n\alpha \frac{\sin n\omega t}{n}$$

wherein $n$ is an odd number of a chosen value, V is the voltage amplitude of the quasi-square wave and $\alpha$ is equal to one half of the angle between the positive and negative going portions of said wave, said angle being chosen such that cos $n\alpha$ is equal to zero comprising a series arrangement of first and second switching devices, first and second series arranged inductances connected between said switching devices, a first capacitance connected across the series combination of said first switching device and said first inductance, a second capacitance connected across the series combination of said second inductance and said second switching device, the junctions of said capacitances and said inductances being connected, a load disposed between said junctions and the midpoint of said source, a third capacitance in shunt with said load, a parallel combination of oppositely poled third and fourth switching devices, a series combination of third and fourth inductances in transformer arrangements respectively with said first and second inductances and connected between one end of said parallel combination and the other end of said load the other end of said combination being connected to the other end of said load, first means having said given frequency in circuit with said first and second switching devices for alternately switching said first and second devices at consecutive half cycles and second means having twice said given frequency in circuit with said third and fourth devices for concurrently switching said third and fourth devices during each half cycle of said third means in a phase retarded (180−2$\alpha$) with respect to said each half cycle.

2. A circuit for converting the output of a unidirectional potential source to a quasi-square wave of a given frequency and having a form in accordance with the expression $$A_n = \frac{4V}{\pi} \sum_n \cos n\alpha \frac{\sin n\omega t}{n}$$

wherein $n$ is an odd number of a chosen value, V is voltage amplitude of the quasi-square wave and $\alpha$ is equal to one half of the angle between the positive and negative going portions of said wave, said angle being chosen such that cos $n\alpha$ is equal to zero comprising a series arrangement of first and second gate controlled rectifiers, first and second series arranged inductances connected between said gate controlled rectifiers, a first capacitance connected across the series combination of said first gate controlled rectifier and said first inductance, a second capacitance connected across the series combination of said second inductance and said second gate controlled rectifier, the junctions of said capacitances and said inductances being connected, a load disposed between said junctions and the midpoint of said source, a third capacitance in shunt with said load, a parallel combination of oppositely poled third and fourth gate controlled rectifiers, a series combination of third and fourth inductances in transformer arrangements respectively with said first and second inductances and connected between one end of said parallel combination and one end of said load, the other end of said combination being connected to the other end of said load, first means having said given frequency in circuit with said first and second gate controlled rectifiers for alternately gating them at consecutive half cycles, and second means having twice said frequency in circuit with said third and fourth gate controlled rectifiers for concurrently gating them twice during every cycle of said first means in a phase retarded (180°−2$\alpha$) with respect to each half cycle of said first means.

3. A circuit as defined in claim 1 and further including a first diode in shunt with said first capacitance and a second diode in shunt with said second capacitance for enabling the return of energy to said source under conditions of reactive loads.

4. A circuit as defined in claim 1 wherein said angle is chosen to be 30° whereby said output quasi-square wave does not contain the odd number triplet harmonics of said given frequency.

No references cited.

JOHN F. COUCH, *Primary Examiner.*

M. L. WACHTELL, *Assistant Examiner.*